United States Patent [19]

Tsuno et al.

[11] Patent Number: 4,615,583

[45] Date of Patent: Oct. 7, 1986

[54] IMAGE FIBERS

[75] Inventors: Koichi Tsuno, Osaka; Kunio Fujiwara, Kanagawa, both of Japan

[73] Assignee: Sumitomo Electric Industries, Ltd., Osaka, Japan

[21] Appl. No.: 582,518

[22] Filed: Feb. 22, 1984

[30] Foreign Application Priority Data

Feb. 22, 1983 [JP] Japan ................. 58-26915

[51] Int. Cl.$^4$ ............................... G02B 6/22
[52] U.S. Cl. ................. 350/96.33; 350/96.25; 350/96.26; 350/96.23
[58] Field of Search ............ 350/94.24, 96.25, 96.26, 350/96.29, 96.30, 96.33, 96.23, 96.34

[56] References Cited

U.S. PATENT DOCUMENTS

| | | | |
|---|---|---|---|
| 3,556,635 | 1/1971 | Schrenk et al. | 350/96.24 |
| 3,981,706 | 9/1976 | Strack | 350/96.24 X |
| 4,252,408 | 2/1981 | Parsons et al. | 350/96.33 |
| 4,300,816 | 11/1981 | Snitzer et al. | 350/96.33 |
| 4,478,488 | 10/1984 | Bagley | 350/96.23 |
| 4,493,530 | 1/1985 | Kajioka et al. | 350/96.34 |

*Primary Examiner*—William L. Sikes
*Assistant Examiner*—Frank González
*Attorney, Agent, or Firm*—Sughrue, Mion, Zinn, Macpeak, and Seas

[57] ABSTRACT

An image fiber in which the contrast of the viewed image is improved. The image fiber of the invention is composed of a plurality of optical fiber cores with a cladding layer provided around the cores and filled into the spaces between the cores. A primary coating covers the cores and cladding layer. The primary coating contains a light-absorbing substance, for instance, carbon particles. Preferably, the primary coating is composed mainly of silicone resin.

4 Claims, 6 Drawing Figures

IMAGE FIBERS

BACKGROUND OF THE INVENTION

The present invention relates to an image fiber capable of preventing the entrance of ambient light.

Among devices utilizing optical fibers is a fiberscope including an image fiber formed by bundling a plurality of optical fibers in a desired configuration and fusing them together into one body. One end of the image fiber is connected to an image-sensing section and the other end to an image-receiving section. Such a fiberscope can generally be used in the examination of confined places where direct examination is impossible. Also, a fiberscope can be used in the examination of locations where the surrounding atmosphere is dangerous, such as in the case of poisonous substances, locations where the temperature is very high, and locations exposed to nuclear radiation.

The structure of a typical fiberscope is shown in FIG. 1. Referring to FIG. 1, the fiberscope is composed of an image-sensing section 1, an image-receiving section 2, and an image-transmitting section 3. An object under the camera section 1 can be viewed through the transmitting section 3 using the image-receiving section 2. In order to illuminate the object being examined, a light guide 5 is connected to the image-receiving section 2. This light guide 5 passes through the transmitting section 3 and reaches the sensing section 1. The light guide 5 is made up of a plurality of plastic fibers 6.

The cross-section of the transmission section 3 is as shown in FIG. 2. In the transmission section 3, the image fiber 7 used to transmit an image from the image-sensing section 1 to the image-receiving section 2, a plurality of plastic fibers used to transmit light for illumination from a light source 4 to the image sensing section 1, and a filler 8 are surrounded by a coating 9. The image fiber 7 is fabricated by coating a bundle of optical fibers 10 with coating 11 of, for example, a silicone resin. The object being examined is illuminated with light from the light source 4 and is viewed with the image-receiving part 2.

Another transmission section structure as shown in FIG. 3 has been proposed. In this structure, a transparent plastic material, such as polymethyl methacrylate (PMNA), is extruded around an image fiber to form a light-transmitting portion 6'. This permits the fabrication of cables of unitary structure. Furthermore, the cross section of the cable is utilized with high efficiency, and transmission of light for illumination and an image can easily be accomplished. In this case, the coating 9 can be formed using an extrusion method.

Part of the light which is used for illumination and which is transmitted through the fiber 6 can get into the image fiber, for example, by reflection from scratches on the surface of the fibers and higher-mode leakage. This reduces the contrast of the field image.

The primary object of the invention is to overcome this problem and hence to provide an image fiber which does not allow the incidence of the light from the outside.

SUMMARY OF THE INVENTION

The above, as well as other objects of the invention, have been met by an image fiber including a plurality of cores, a cladding layer covering the cores and filling the space between the cores, and coating containing a light-absorbing substance surrounding the other elements.

DESCRIPTION OF THE PREFERRED EMBODIMENTS

Figure 1:
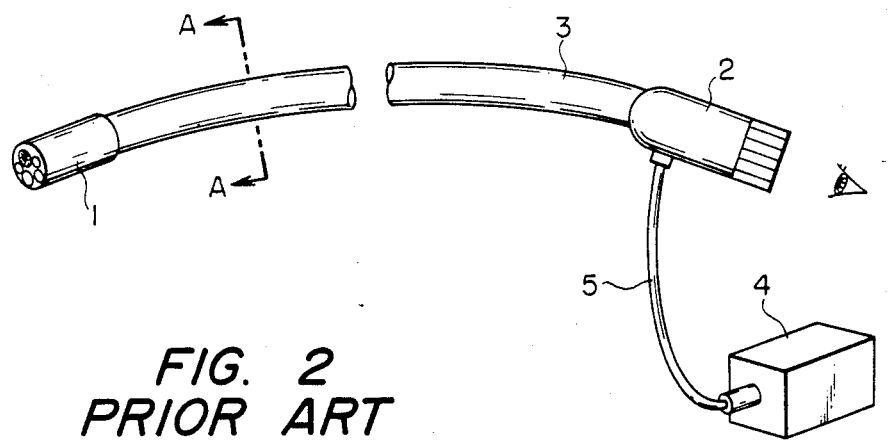
FIG. 1 is a view illustrating the overall structure of a iberscope.
Figure 2:
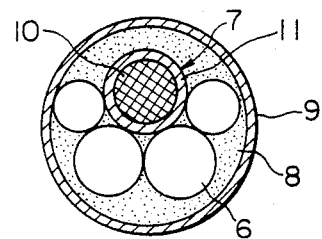
FIG. 2 is a cross-sectional view taken along a line A—A in FIG. 1.
Figure 3:
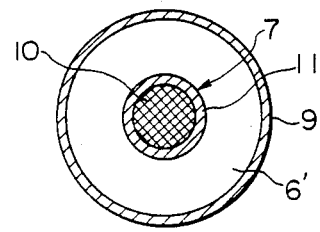
FIG. 3 is a cross-sectional view of an alternative construction of a fiberscope.
Figure 4:
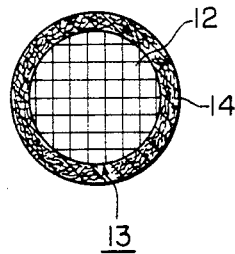
FIG. 4 is a cross-sectional view showing an image fiber of the present invention.

Referring now to FIG. 4, a preferred embodiment of an image fiber of the invention is shown in cross-section. A fiber bundle 13 is produced by bundling a plurality of optical fibers 12 and covering that bundle with a primary coating 14. The primary coating 14 is light-absorbing, and made, for instance, of a silicone resin incorporating a light-absorbing substance. Examples of suitable light-absorbing substances include carbon particles, NiO, $Co_2O_3$, CuO, $Cr_2O_3$ and MnO. A cladding layer is provided around the core. After drawing of the optical fiber 12, the primary coating 14 is coated on the outside of the bundle and heat-cured, thereby to provide reinforcement. The thickness of the primary coating 14 should be sufficient to provide a desired level of strength. If silicone resin incorporating carbon particles is employed, the amount of carbon particles should be sufficiently small that the strength of the resin material is not appreciably degraded.

With this arrangement, light from the fiber 6 and the ambient light from the surrounding atmosphere is absorbed by the primary coating 14, and thus prevented from entering the image fiber. Hence, the contrast of an image viewed at the image-receiving section 2 is not reduced.

Figure 5:
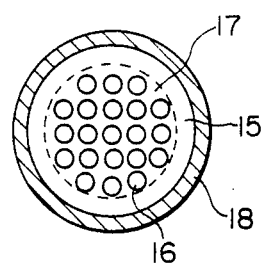
FIG. 5 is a cross-sectional view showing a modification of the fiber of the invention.

Another embodiment of the invention is illustrated in FIG. 5. In this embodiment, cladding material 17 is filled into the spaces around plural cores (individual optical fibers) 16. A quartz sleeve 15 is provided around the cladding material 17 and cores 16. The quartz sleeve 15 is surrounded by a primary coating 18. The same materials as described above can be used for the primary coating 18. In this embodiment, substantially all stray light is absorbed by the primary coating 18. Thus, as in the first-discussed embodiment, there is no degradation of an image being viewed through the fiberscope.

It is possible to obtain substantially the technical affect by providing a light-absorbing layer around a non-light-absorbing conventional primary coating. In such a case, however, the overall diameter of the bundled fiber is large.

To increase the amount of absorption of light, it is preferable that the refractive index of the primary coating be higher than that of the cores or sleeve.

Figure 6:
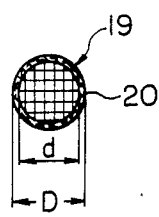
FIG. 6 is a cross-sectional view showing dimension of a fiber of the invention.

As an example, an image fiber was constructed utilizing the teaching of the present invention. It was found possible to produce such an image fiber with an outer diameter (d indicated in FIG. 6) of the bundle 19 of approximately 0.5 mm. In this case, the diameter (D in FIG. 6) of the primary coating 20 was 0.6 mm. In this example, carbon particles having a particle size of not more than 1 micron were incorporated into the primary coating in an amount of approximately 1% by weight. It was found that 95% of the ambient light which entered the image fiber in the conventional construction was eliminated with the use of the invention. No appreciable loss of contrast was observed, even when illuminating light of a high intensity was passed through the fiber 6.

As described above, in an image fiber of the invention, a primary coating containing a light-absorbing substance is provided around a bundle of optical fiber cores. This eliminates most light which previously entered the cores either from light-transmitting fibers or from the outside. Hence, the contrast of the image obtained with the fiber of the invention is quite good.

We claim:

1. An image fiber comprising:
   a plurality of optical fiber cores;
   a cladding layer provided around said cores and filled into spaces between said cores;
   a primary coating covering said cores and said cladding layer, said primary coating containing a light-absorbing substance; and
   a quartz sleeve provided between said primary coating and said plurality of optical fiber cores.
2. The image fiber as claimed in claim 1, wherein said light-absorbing substance is carbon particles.
3. The image fiber as claimed in claim 1, wherein said light-absorbing substance comprises a material selected from the group consisting of carbon particles, NiO, $CO_2O_3$, CuO, $Cr_2O_3$ and MnO.
4. The image fiber as claimed in claim 1, wherein said primary coating consists primarily of a silicone resin.

* * * * *